United States Patent [19]
Melrose

[11] Patent Number: 5,062,133
[45] Date of Patent: Oct. 29, 1991

[54] MULTI-FUNCTION TELEPHONE CALL MANAGEMENT SYSTEM

[75] Inventor: Thomas O. Melrose, Boulder, Colo.

[73] Assignee: Logotronix Incorporated, Boulder, Colo.

[21] Appl. No.: 376,433

[22] Filed: Jul. 7, 1989

[51] Int. Cl.[5] .................. H04M 1/64; H04M 3/58
[52] U.S. Cl. .................................. 379/94; 379/104; 379/102; 379/74
[58] Field of Search .................. 379/94, 67, 95, 96, 379/97, 98, 102, 100, 104, 211, 212, 201

[56] References Cited

U.S. PATENT DOCUMENTS

| | | | |
|---|---|---|---|
| 4,670,628 | 6/1987 | Boratgis | 379/211 |
| 4,674,115 | 6/1987 | Kaleita et al. | 379/102 |
| 4,680,781 | 7/1987 | Amundson et al. | 379/93 |
| 4,788,714 | 11/1988 | Hashimoto | 379/100 |
| 4,802,202 | 1/1989 | Takahashi et al. | 379/67 |
| 4,813,070 | 3/1989 | Humphreys et al. | 379/67 |
| 4,926,461 | 5/1990 | Kuok | 379/212 |

*Primary Examiner*—Jin F. Ng
*Assistant Examiner*—Stella L. Woo
*Attorney, Agent, or Firm*—Dorr, Carson, Sloan & Peterson

[57] ABSTRACT

The multi-function telephone call management system enables a user to recursively activate a plurality of voice communication features on a single call connection. The multi-function telephone call management system serves to interconnect a plurality of communication devices with a single incoming telephone line. The apparatus and features provided by this multi-function telephone call management system include connection to a modem, facsimile machine, or answering machine and call forwarding, call screening, call notification and distinctive ringing services. All of the above features are provided by the multi-function telephone call management system on a single call connection by the use of the recursive feature contained therein. This recursive feature enables a caller to sequence through the various call features provided by this apparatus on a single call connection. The sequence and selection of call options are completely under control of the caller.

12 Claims, 3 Drawing Sheets

MULTI-FUNCTION TELEPHONE CALL MANAGEMENT SYSTEM

FIELD OF THE INVENTION

This invention relates to telephone switching systems and, in particular, to a multi-function telephone call management system that interconnects a single incoming telephone line with a plurality of communication devices and allows the user to recursively access the communication devices on a single call connection.

PROBLEM

It is a problem in the field of telephone switching apparatus to interconnect a plurality of communication devices to a single telephone line and provide an incoming call with access to more than a single one of these communication devices. There are numerous prior art telephone switching systems and these range from the large central office switches that serve tens of thousands of lines down to single line telephone switching systems that provide enhanced services for the user who is served by a single telephone line. In the field of single line telephone switching systems, there are numerous arrangements to interconnect a data communication device with the single telephone line on a shared basis with the telephone station set. These single line telephone switching systems include systems that provide a recorded announcement to an incoming caller and then enable the incoming caller to provide a signal on the call connection indicative of a request to transmit a facsimile document. This system responds to the facsimile request by switching the answering machine off the call connection and instead switching a facsimile machine in its place. Similarly, there are single line telephone systems that enable a user to receive a combined voice/data call by bridging a modem and a telephone station set on the communication in parallel. If the incoming call is a data call, the telephone station set is removed from the line and the modem receives the data transmitted on the incoming call. Upon the completion of the data transfer, the modem is removed from the line and the telephone station set connected in its place.

In all of these single line telephone switching systems, the ability is provided to interconnect a single selected communication device to the call connection in place of the telephone station set. The emphasis appears to be on providing a data call connection on the single line without displacing the voice communication ability of the user. However, in all of these systems, the user has a very limited repertoire of voice communication options. The voice communication connection consists of ringing the telephone station set and if the user does not answer providing a connection to an answering machine. The incoming caller has no ability to control the sequencing of the single line telephone switching apparatus and must at best leave a recorded message on an answering machine.

SOLUTION

The above described problems are solved and a technical advance achieved in the field by the multi-function telephone call management system that enables a user to recursively activate a plurality of voice communication features on a single call connection. The multi-function telephone call management system serves to interconnect a plurality of communication devices with a single incoming telephone line. The apparatus and features provided by this multi-function telephone call management system include connection to a modem, facsimile machine, or answering machine and call forwarding, call screening, call notification and distinctive ringing services.

In response to an incoming call, the caller is provided with a recorded announcement that indicates the various options available to the caller. The caller can then elect any one of these options by dialing the associated code indicated by the recorded announcement. If the selected option proves unproductive for the caller, the call either automatically returns to the answering machine or the caller may dial another feature selection code in order to activate another feature of this system. In this fashion, the caller can recursively sequence through the plurality of voice communication options that are provided by the multi-function telephone call management system without having to initiate another call.

A possible call connection in this system begins with an incoming caller being connected to an answering machine. If the caller does not initially elect to leave a message on the answering machine, the caller can dial a special access code that activates the call screening function which enables predesignated users to activate certain features. If the caller is one of these designated users, the caller can activate distinctive ringing to provide a special alerting function in the event that multi-function telephone call management apparatus is activated to screen incoming calls. If the distinctive ringing is not successful in accessing the user, the caller can dial a second access code which activates the call screening function to forward the call to a predesignated call forwarding number, such as the user's mobile phone. If this call connection tests busy or there is no answer after a predetermined amount of time, the caller reverts to the answering machine where the caller can then leave a recorded message on the answering machine. The caller can then dial another access code to activate the facsimile apparatus to thereby transmit various documents to the user, or may re-enter the call screening access code and have the call forwarded to the user's mobile phone again.

All of the above features are provided by the multi-function telephone call management system on a single call connection by the use of the recursive feature contained therein. This recursive feature enables a caller to sequence through the various call services provided by this apparatus on a single call connection. The sequence and selection of call options are completely under control of the caller.

DETAILED DESCRIPTION

Figure 1:
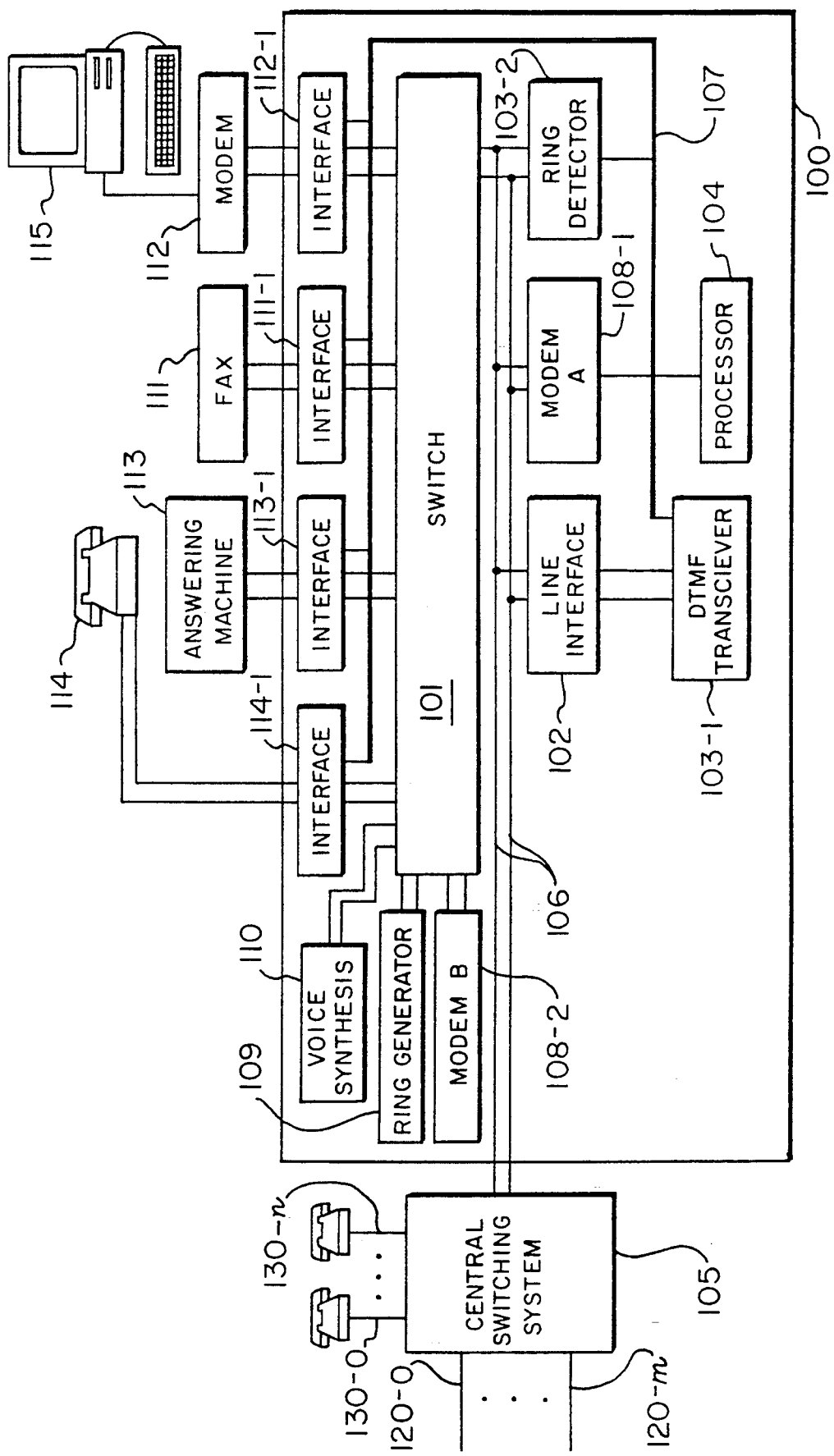
FIG. 1 illustrates in block diagram form the system architecture of the multi-function telephone call management apparatus.

The multi-function telephone call management system enables a user to recursively activate a plurality of voice communication features on a single call connection. The multi-function telephone call management system serves to interconnect a plurality of communication devices with a single incoming telephone line. The apparatus and features provided by this multi-function telephone call management system include connection to a modem, facsimile machine, or answering machine and call forwarding, call screening, call notification and distinctive ringing services.

In response to an incoming call, the system provides the caller with a recorded announcement that can indicate the various options available to the caller. Alternately the owner of the system can provide the appropriate codes to designated users and the system can provide to all callers a conventional answering machine message. The caller can then elect any one of these options by dialing the associated code indicated by the recorded announcement or prior information. If the selected option proves unproductive for the caller, the call either automatically returns to the answering machine or the caller may dial another feature selection code during the operation of the previous selection in order to activate another feature of this system. In this fashion, the caller can recursively sequence through the plurality of voice communication options that are provided by the multi-function telephone call management system without having to initiate another call. A typical call connection in this system begins with an incoming caller being connected to an answering machine. If the caller does not initially elect to leave a message on the answering machine, the caller can dial a special access code that activates the call screening function which enables the users to activate certain features. The caller can activate distinctive ringing to provide a special alerting function in the event that the multi-function telephone call management apparatus is activated to screen incoming calls. If the distinctive ringing is not successful in accessing the user, the caller can dial a second access code which activates the call screening function to forward the call to a predesignated call forwarding number, such as the user's mobile phone. If this call connection tests busy or there is no answer after a predetermined amount of time, the caller reverts to the answering machine where the caller can then leave a recorded message on the answering machine. Upon the completion of the answering machine function, the caller can then dial another access code to activate the facsimile apparatus to thereby transmit various documents to the user, or can activate any other function that they have the appropriate code for.

All of the above features are provided by the multi-function telephone call management system on a single call connection by the use of the recursive feature contained therein. This recursive feature enables a caller to sequence through the various call services provided by this apparatus on a single call connection. The sequence and selection of call options are completely under control of the caller.

SYSTEM ARCHITECTURE

FIG. 1 illustrates in block diagram form the basic system architecture of the multi-function telephone call management system 100. This apparatus is connected via a single communication line 106 to a central telephone switching system 105, such as a private branch exchange or a telephone central office. This central telephone switching system 105 serves a plurality of users and may be an electronic switch of the type that provides voice and data switching capability. The central telephone switching system 105 serves to interconnect the various lines 120-0 to 130-n that it serves and to also provide interconnections between these lines 130-0 and 130-n and any one of a plurality of incoming trunks 120-0 to 120-n that interconnect this central telephone switching system 105 with the common carrier facilities.

The multi-function telephone call management system 100 serves to interconnect a single telephone communication line 106 with a plurality of communication devices 111-114, some of which are illustrated in FIG. 1. These communication devices 111-114 can consist of a facsimile machine 111, a modem 112 that serves a personal computer, an answering machine 113, and a telephone station set 114. These communication devices 111-114 are merely exemplary of the operation of the multi-function telephone call management system 100 and other communication devices or other combinations of communication devices can be interconnected with the multi-function telephone call management system 100. As described above, the multi-function telephone call management system 100 enables a caller on an incoming call to designate the ones of these communication devices 111-114 or the call handling features of multi-function telephone call management system 100 that the caller wishes to access. This access can be sequential, in that the caller can sequence through a number of these communication devices 111-114 or features and this sequencing operation is performed in a recursive manner where the caller is provided with the option to make another selection during or following the activation of a previous selection. Therefore, the caller has full access to all of the communication devices 111-114 illustrated in FIG. 1 and the call handling features on an unlimited basis to provide the caller with maximum utilization of these communication devices 111-114 and features in transmitting both voice and data information to the user.

The communication line 106 enters the multi-function telephone call management system 100 and is connected to a switching circuit 101 that serves to perform the physical interconnection of the incoming communication line 106 with the plurality of communication devices 111-114 via their associated interfaces 111-1 to 114-1. In addition, the communication line 106 is connected directly to a telephone line interface 102 that serves to provide a call termination impedance and the on hook/off hook switching function associated with such apparatus. Also connected to the communication line 106 is an incoming call detection circuit 103 that functions to detect the presence of various incoming call (103-2) and call control (103-1) signals that are present on the communication line 106 during the call connection. The call control signals are processed by a call signal transceiver 103-1 that is connected to the communication line 106. This circuit also functions to enable the multi-function telephone call management system 100 to apply call control signals to the communication line 106. Such a transceiver can be the well-known 8880 device manufactured by Mitel. The operation of these various devices is regulated by processor 104 which is interconnected with the various circuitry by way of a plurality of signal lines 107. The operation of the processor 104 is regulated by a control program that is stored in its memory, which control program is illustrated in flow diagram form in FIGS. 2 and 3. This flow diagram indicates the major functional capabilities of the multi-function telephone call management system 100 and is a distillation of the essential elements of the program that regulates the operation of the various apparatus and performs internal test functions, which details are unnecessary for an understanding of the invention described herein and are not disclosed herein for the purpose of simplicity.

FLOW DIAGRAM

Figure 2:
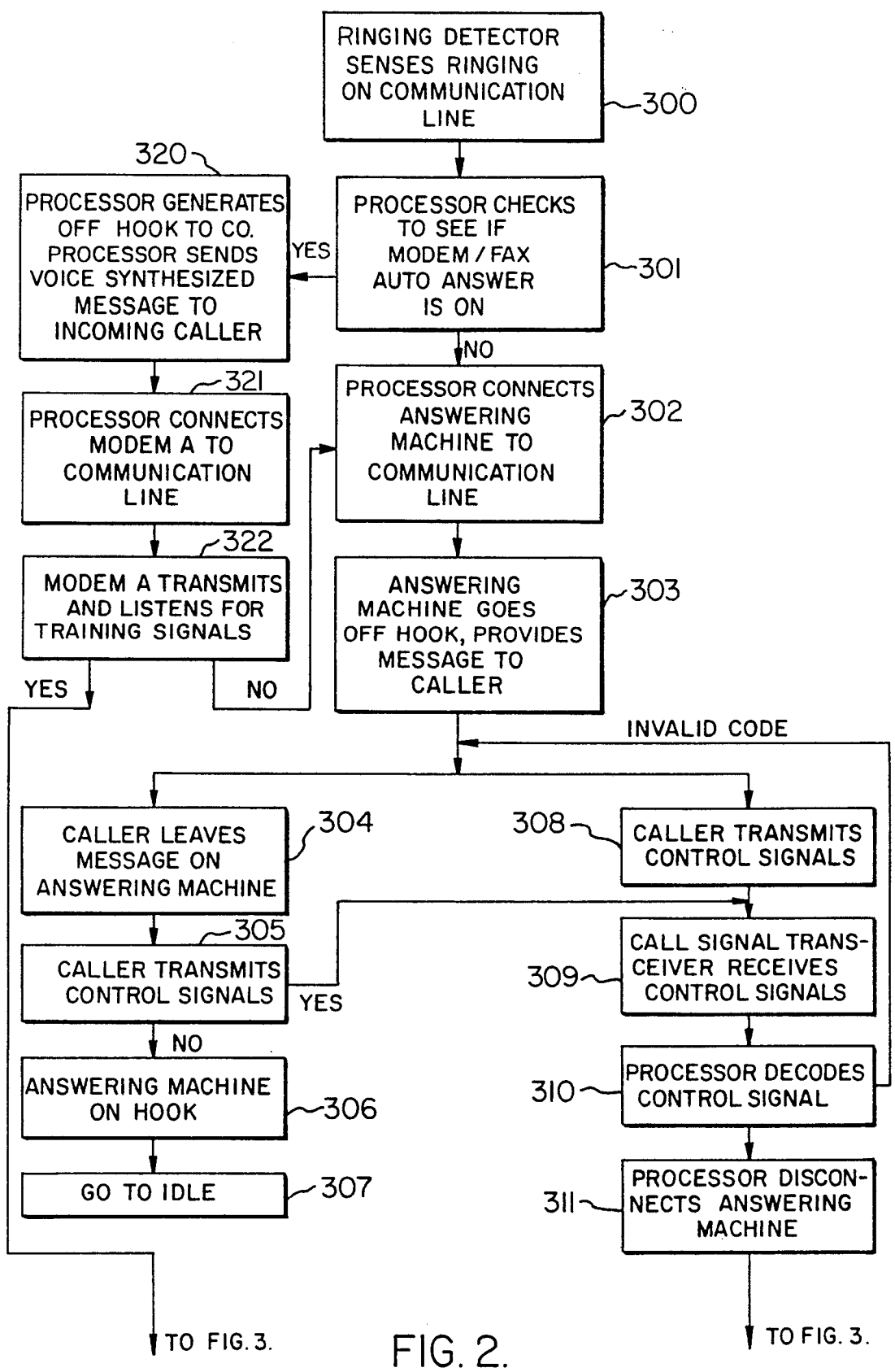
FIGS. 2 and 3 illustrate in flow diagram form the operation of the multi-function telephone call management apparatus.
Figure 3:
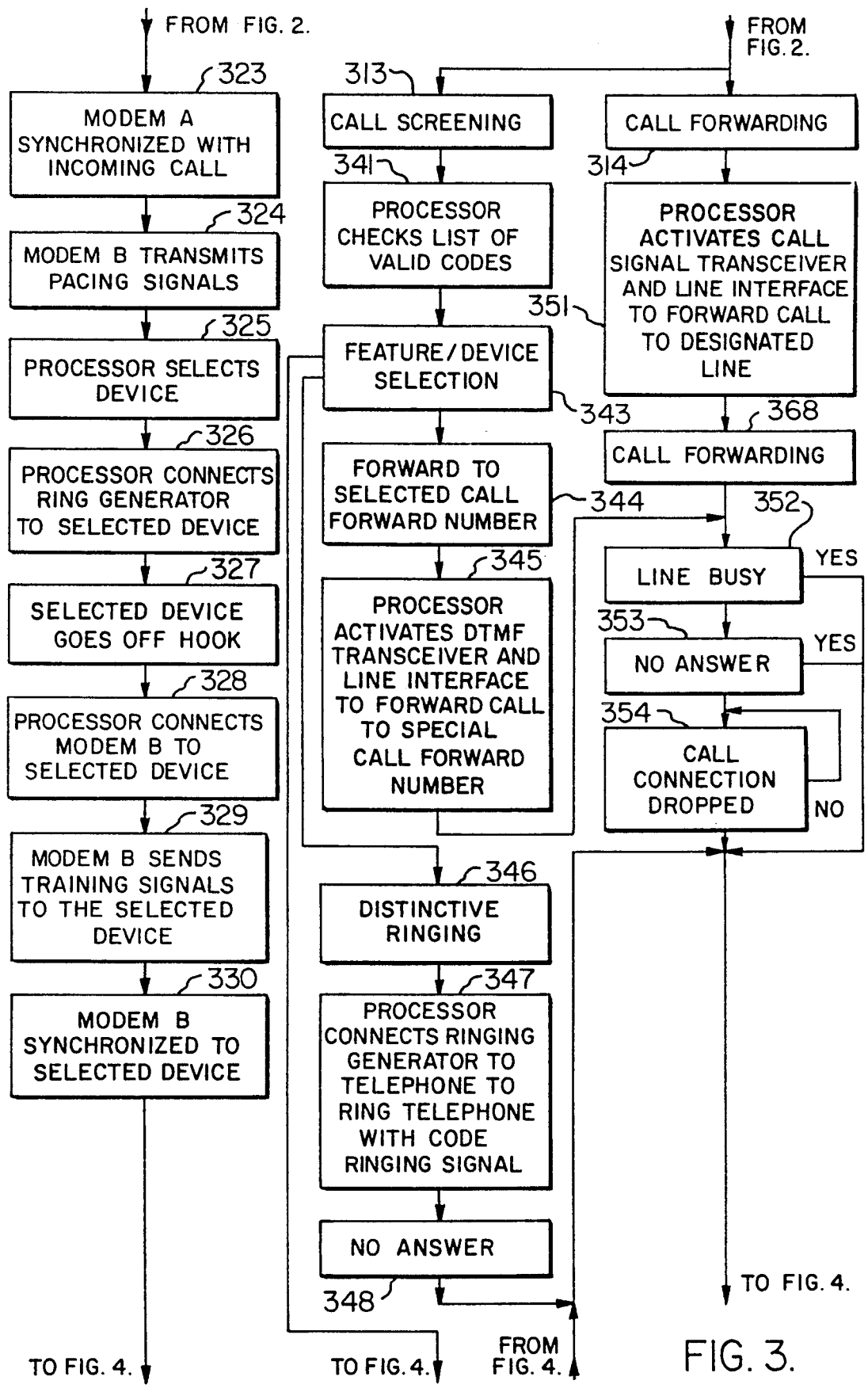

FIGS. 2 and 3 illustrate in flow diagram form the operational steps taken by multi-function telephone call management system 100 to provide a caller with recursive access to the various communication devices 111-114 and call handling features available in multi-function telephone call management system 100. It is obvious that multi-function telephone call management system 100 can be programmed to activate any combination of the features described below in any configuration or order. This enables the user to customize the operation of the system. In order to understand the operation of this apparatus, a typical call connection is described to illustrate some of the numerous options available to the caller.

A caller places an incoming call to multi-function telephone call management system 100 from any one of the lines 130-0 to 130-n served by central switching system 105 or from a remote location via common carrier facilities in which case the call arrives on one of the plurality of trunks 120-0 to 120-m that interconnect central switching system 105 with the common carrier facilities. In either case, the incoming call is interconnected by central switching system 105 to communication line 106 that serves multi-function telephone call management system 100. As part of the incoming call process, central switching system 105 applies a ringing signal to the communication line 106 that serves multi-function telephone call management system 100.

INCOMING CALL

Ringing detector 103-2 at step 300 senses the presence of a ringing signal on the communication line 106 and transmits a control signal via conductors 107 to processor 104. At step 301, processor 104 reviews the auto answer status of FAX 111, Modem 112 by reading the selection stored in its memory. At step 302, processor 104 responds to the control signal indicative of a ringing signal placed on communication line 106 by transmitting control signals via conductors 107 to switch 101 and interface 113-1 to interconnect the answering machine 113 with the communication line 106. At step 303, the answering machine 113 responds to the ringing signal placed on communication line 106 by central switching system 105 by going off hook thereby tripping ringing and causing central switching system 105 to interconnect the caller with multi-function telephone call management system 100. At step 303, answering machine 113 provides a predetermined prerecorded message to the caller. This message could typically indicate the various call options available to the caller. These options include interconnecting the caller with a communication device that receives data, such as facsimile machine 111 or modem 112 that serves personal computer 115. If the caller wishes to provide a voice communication message, the caller can leave a message on answering machine 113 or attempt to reach the user served by multi-function telephone call management system 100 by accessing a number of call handling features, such as distinctive ringing or call forwarding.

ANSWERING MACHINE MESSAGE

Assume for the purpose of this description, that the caller at step 303 receives the message provided by answering machine 113. At step 304, the caller elects to leave a message on the answering machine in standard fashion. This is accomplished in well known fashion and upon the completion of the message, the caller at step 305 can transmit control signals to access one of the other communication devices 111-114 or one of the call handling features available on multi-function telephone call management system 100. If the caller decides to terminate the call at this point, processing advances to step 306 where the answering machine 113 responds to the caller terminating the call connection by going on hook. The on hook condition of answering machine 113 is detected by line interface 102 which transmits control signals via conductors 107 to processor 104. Processor 104 proceeds to step 307 where the multi-function telephone call management system 100 is reset to its idle state. If, at step 305 or at step 308 the caller elects to transmit control signals via communication line 106 to multi-function telephone call management system 100, call processing advances to step 309. Call signal transceiver 103-1 continually monitors communication line 106 for the presence of control signals thereon. It is through this mechanism that multi-function telephone call management system 100 can respond to control requests from the caller to access one of the communication devices 111-114 or one of the call handling features during the call connection. Since call signal transceiver 103-1 continually monitors communication line 106, at any point in the call connection the caller can activate the recursive feature of multi-function telephone call management system 100 which terminates the presently active communication device 111-114 or call handling feature to return control to processor 104 which responds to the control signals applied to communication line 106 by the caller. At step 309, the call signal transceiver 103-1 receives the control signals applied to the communication line 106 by the caller. At step 310, processor 104 receives the control signals detected by call signal transceiver 103-1 and decodes these control signals to determine if the code is valid and what request has been received from the caller on communication line 106. At step 311 processor 104 responds to the valid control signals on communication line 106 as detected by call signal transceiver 103-1 by disconnecting answering machine 113 from the call connection. This is accomplished by processor 104 transmitting control signals via conductors 107 to switch 101 and interface 113-1 to disconnect answering machine 113.

A plurality of options are available for the caller. These includes activating one of the data communication devices such as fax 111 or modem 112 or activating the call screening function or the call forwarding function of multi-function telephone call management system 100.

CALL FORWARDING

If, at step 311, processor 104 decodes control signals indicative of a call forwarding request, processing advances to step 314 to begin the call forwarding subroutine. The call forwarding operation is one that is described in additional detail in U.S. Pat. Nos. 4,670,628 and 4,737,982. The following summary description of the operation of that apparatus is provided herein in order to illustrate the concept of this invention. The call forwarding function consists of multi-function telephone call management system 100 making use of the three way calling capability available in central switching system 105. Thus, when the caller activates the call forwarding feature at step 314, processing advances to step 351 where processor 104 retrieves a preprogrammed call forwarding number from its memory. This preprogrammed call forwarding number routes the incoming call to a designated line that is served by central switching system 105 or that can be reached via the common carrier facilities.

Assume for the purpose of this discussion that the designated line is line 130-0 served by central switching system 105. In this case, processor 104 retrieves the telephone number of line 130-0 from its memory and activates call signal transceiver 103-1 and line interface 102 to forward the call to this designated line. The call forwarding operation is accomplished by line interface 102 generating a switch hook flash on communication line 106. Central switching system 105 responds to the presence of a switch hook flash on communication line 106 by providing dial tone to multi-function telephone call management system 100. The presence of dial tone on communication line 106 causes processor 104 to activate call signal transceiver 103-1 to transmit the telephone number of the designated line on communication line 106. In response to the transmission of this telephone number on communication line 106, central switching system 105 establishes a call connection for a multi-function telephone call management system 100 to the designated line 130-0. Central switching system 105 applies a ringing signal through line 130-0 in well known fashion.

CALL PROGRESS MONITORING

At step 352, processor 104 checks to determine whether communication line 130-0 is busy. This is accomplished by processor 104 monitoring communication line 106 via call signal transceiver 103-1 to detect the presence of a busy signal thereon. A busy signal is present on communication line 106, processing advances to step 355 on FIG. 3. If the call forwarded line is not busy, processing advances to step 353 where processor 104 monitors the condition of communication line 106 to determine whether a call forward don't answer condition exists. This is accomplished by processor 104 monitoring communication line 106 to detect the presence of a voice signal thereon. If no voice signal is detected after a predetermined amount of time, processing advances to step 355. If a voice signal is detected on communication line 106, processing advances to step 354 where processor 104 monitors the busy idle status of the three way call established by central switching system 105.

Once the party at designated line 130-0 goes on hook, the call connection is dropped at step 354 and processing advances to step 355. Processor 104 at this step connects the caller to a voice synthesis circuit 110 which provides a message to the caller indicating that the answering machine will be connected again on the line so that the caller can leave a message or access one of the other communication devices 111-114 or call handling features. Upon the completion of the message produced by voice synthesis circuit 110, processing advances to step 356 where processor 104 connects ring generator 109 through switch 101 to answering machine 113 to activate the answering machine. In response to the ringing signal applied to its input port, answering machine 113 goes off hook at step 357 and processing returns to step 303 where processor 104 interconnects the answering machine 113 with communication line 106. Thus, the caller is returned to the initial menu selection step in the call handling process and can elect to interconnect with another one of the communication devices 111-114 served by multi-function telephone call management system 100 or the caller can activate another one of the call handling features as is described below.

CALL SCREENING

At this point, the caller can again transmit control signals as described above to elect a different feature. Alternatively, at step 311 the caller can have initially selected the call screening feature as the primary choice. Call screening is the generic term used to indicate the function provided by multi-function telephone call management system 100 that enables certain predetermined users access to a subset of communication features not available to the general public. Examples of such features are call forwarding to a line other than the designated line. An example of this is that a authorized caller can have the call forwarded to the user of multi-function telephone call management system 100 at a number that is not available to the general public such as the user's mobile phone or a personal home phone as opposed to the designated line which can be an answering service or an office number. Another option provided by call screening is the option to provide a distinctive ringing signal that works in conjunction with the answering machine 113 and provides a distinctive alerting signal to the user of multi-function telephone call management system 100 to indicate that an authorized caller is attempting to reach the user.

CALL SCREENING EXAMPLE

In order to better understand the operation of the call screening algorithm, an example is provided herein. At step 341, processor 104 scans the control signals applied to communication line 106 by the caller to determine whether the call screening code applied to the communication line 106 matches the data stored in the memory of processor 104. In particular, processor 104 determines whether the caller's identification code matches the list of valid identification codes stored in the memory of processor 104. The caller identification code can be provided in a number of ways. The caller can dial a predetermined access code that identifies the caller as an authorized caller. This access code can itself be one of a plurality of access codes, each of which identifies a group or class of authorized callers, each group of which can be entitled to access a different subset of the capabilities of the multi-function telephone call management system 100.

Alternatively, in an ISDN or class environment, the calling line number may be transmitted as a preamble to the call. This calling line number data can be used as screening data to screen incoming calls. The incoming call can then be automatically screened by calling line number identification rather than requiring the caller to input an access code. Furthermore, the incoming call identification information can also include calling device data that identifies the presence of a fax or modem device on the incoming call. This enables the call management system 100 to identify the calling device to distinguish between a fax and a modem as described below. If there is no match, processing advances to step 342 where the call connection is terminated.

CALL SCREENING FEATURE SELECTION

If the caller's identification code does match the list of authorized identification codes, processing advances to step 343 where processor 104 identifies the feature selected by the caller. If the caller has selected distinctive ringing, processing advances to step 346 where the distinctive ringing subroutine is activated. At step 347, processor 104 activates ringing generator 109 and switch 101 to apply a distinctive ringing signal via switch 101 and interface 114-1 to the user's telephone 114. This distinctive ringing signal can be a coded ringing signal that alerts the user that an authorized caller is on the line attempting to reach the user. The coded ringing signal can be multiple ringing patterns, each associated with a unique identification code. In addition, the ringing can be applied in a distributed or distinctive pattern where multiple ringing devices are provided and the selection of the ringing device or devices is a function of the identification code.

If there is no response to the distinctive ringing after a predetermined number of rings, processor 104 at step 348 determines that the user is not available to answer telephone station set 114 and processing returns to step 355 as described above where the processor 104 connects the caller to the voice synthesis circuit 110. This enables the caller to return to the initial menu selection step once they are connected to the answering machine to enable the caller to select one of the other communication devices 111-114 or call handling features of multi-function telephone call management system 100.

If, at step 343, processor 104 had determined that the caller requested forwarding to a special call forwarding number at step 344, processor 104 would determine the identity of the special call forwarding number. This can be accomplished in a number of ways. The memory in processor 104 can be programmed to have different call forwarding for different authorized caller identification codes. Thus, certain callers would have their calls forwarded to the user's mobile phone for example while others may have their calls forwarded to the user's office or an associate of the user. Still other callers could have their calls forwarded to the user's spouse since the caller's identification code is indicative of a personal telephone call as opposed to a business telephone call.

If, at step 343, processor 104 had determined that the caller selected connection to an associated device 111-113, at step 362 the selected device would be connected to the ring generator 109 and ringing would be sent to the selected device. At step 363 the processor 104 detects the selected device going off hook in response to the ringing signal. The processor 104 then connects the selected device to the central switching system 105 via communication line 106. At step 364 the caller may request that the connection to the selected device be terminated. If at step 365 the processor 104 decodes the disconnect code or finds that the selected device has gone on hook it proceeds to step 355 described above. If neither of these conditions are met, processor 104 proceeds to step 366 where it checks to see if the connection to the caller is still intact. If it is, processor 104 returns to step 364 and continues to look for a disconnect code. If the connection to the caller has been dropped then control is returned to the idle mode.

The selection of this programming is under control of the user and processor 104 at step 344 determines the identity of the special call forwarding number as written in its memory. At step 345, processor 104 activates line interface 102 to generate a switch hook flash on communication line 106 to activate the three way calling feature of central switching system 105. As described above, processor 104 then outputs the designated telephone number via call signal transceiver 103-1 and processing advances to step 352 as described above where processor 104 determines whether the call forwarded call has been answered. Processing advances through steps 352 to 357 as described above for the standard call forwarding case and the caller again has the option to access the initial call selection menu to sequence through yet another communication device 111-114 or call handling feature of multi-function telephone call management system 100.

FAX/MODEM CALL

A further selection available to the caller is to provide a data communication connection to one of the communication devices 111-114. At step 301, if the automatic modem/fax feature has been activated the voice synthesizer sends out a notification that call management system 100 is activating a modem/fax test. This test is initiated at step 321, where processor 104 begins the fax/modem interconnect subroutine. At step 321, processor 104 connects modem A 108-1 to communication line 106 to provide a call termination for the incoming fax or modem call. At step 322, processor 104 activates modem A 108-1 via control leads 107 to cause modem A to transmit a mark tone corresponding to the highest speed one of devices 111, 112, each of which operates at a different speed, on communication line 106 and then wait and listen for training signals from the incoming fax or modem call. At step 323, modem A responds to the training signals on the incoming call by synchronizing itself with the fax or modem at the caller's line. If no training signal response is received, processor 104 assumes the call is a voice call and connects the ring generator 109 to the answering machine 113. When the answering machine 113 goes off hook it is connected to central switching system 105 and the caller proceeds with a voice call as described above. Otherwise, at step 324, modem A transmits pacing signals on the communication line 106 to maintain the call connection with the caller's fax or modem device.

Processor 104 at step 325 selects the called device to complete the interconnection of communication line 106 with either fax 111 or modem 112. Processor 104 selects the called device as a function of the band rate that modem A synchronized to on the incoming call. The speed and device characteristics of fax 111 and modem 112 are stored in processor 104 (ex. fax=9600 band, modem=1200) and thus processor 104 can identify the called device based upon the incoming call characteristics. In order to interconnect the user's fax or modem device with the communication line 106, processor 104 at step 326 connects ringing generator 109 via switch 101 and the associated interface with either fax 111 or modem 112 to ring the communication device. At step 327, the fax 111 or modem 112 responds to the ringing signal applied thereto by going off hook. The off hook condition of either fax 111 or modem 112 is sensed by its associated interface circuit 111-1 or 112-1 respectively and the off hook condition communicated to processor 104 via control leads 107. In response to the off hook condition of fax 111 or modem 112, processor 104 at step 328 connects modem B via switch 101 to fax 111 or modem 112. At step 329, processor 104 transmits control signal via control leads 107 to modem B to activate this modem to transmit training signals to fax 111 or modem 112 connected thereto. The interfacing between modem B and the one of fax 111 or modem 112 that is connected thereto proceeds in well known fashion until at step 330 modem B is synchronized with fax 111 or modem 112. The synchronization is communicated by modem B to processor 104 via control leads 107. At step 331, processor 104 interconnects fax 111 or modem 112 to the communication line by activating switch 101 to connect modem B to the communication line via modem A. It is not possible to directly connect the incoming call to the fax 111 or modem 112 because of possible phase angle errors between the two devices unless there is a zero phase angle difference between modem A and modem B.

At step 332, the associated interface device 111-1 or 112-1 determines that fax 111 or modem 112 respectively has gone on hook terminating the call connection for the data transmission. The on hook status is transmitted via control lead 107 to processor 104 which then provides the caller with the option to interconnect to another one of the communication devices 111-114 or activate one of the call handling features of multi-function telephone call management system 100. This is accomplished by processor 104 proceeding to step 355 as described above where the voice synthesis circuit is connected to communication line 106 to alert the caller that the answering machine is to be connected to the call connect. The caller then is able through the main menu selection as described above to access one of the communication devices or call handling features of multi-function telephone call management system 100.

SUMMARY

As can be seen from the above described hypothetical call connection, processor 104 recursively returns the call connection to the main menu selection step where the caller can access any selected one of communication devices 111-114 or any of the call handling features provided by the multi-function telephone call management system 100. The route this call connection, call signal transceiver 103-1 monitors the communication line 106 for the presence of control signals thereon. The caller can place control signals on the communication line 106 at any point in the call connection to thereby terminate the present connection to a selected communication device 111-114 or to terminate an active call handling feature in order to proceed with connection to another one of the communication devices 11-114 or access to another call handling feature. Thus, the caller controls the number and ordering of the features and devices accessed in the call connection. The call connection remains up through this recursive feature to enable the caller to sequentially access a number of the voice communication services and devices as well as any or all of the data communication devices served by multi-function telephone call management system 100. In this fashion, multi-function telephone call management system 100 provides a caller with the ability to select a number of options heretofore unavailable on a single line telephone switching systems.

While a specific embodiment of this invention has been disclosed, it is expected that those skilled in the art can and will design alternate embodiments of this invention that fall within the scope of the appended claims.

I claim:

1. In a telephone system that includes a switching system that serves a plurality of lines, apparatus connected to and interconnecting one of said lines and a plurality of communication devices, which communication devices include two or more data communication apparatus each operating at a different data transmission speed, for enabling an incoming call on said one line to sequentially access at least two of said communication devices, said apparatus comprising:

means connected to said one line and responsive to incoming call signals applied to said one line for terminating said one line to establish a call connection;

means connected to said one line for detecting signals generated external to said apparatus and applied to said one line including:

first modem means responsive to the presence of a carrier tone applied to said one line for applying a control signal, indicative of the data transmission speed of said carrier tone, to said control means;

switching means for selectively interconnecting said one line and one of said plurality of communication devices in response to said detected signals; and control means responsive to said one communication device disconnecting from said communication connection and said detecting means detecting the presence of externally generated control signals applied to said one line for activating said switching means to interconnect said one line with the one of said plurality of communication devices indicated by said applied control signals, including:

means responsive to said control signal for selecting one of said data communication apparatus as a function of said detected data transmission speed.

2. The apparatus of claim 1, further including:

second modem means connectable by said switching means to said two or more data communication apparatus;

said control means further includes:

means responsive to said control signal for activating said switching means to interconnect said first and said second modem means and said second modem means and said selected data communication apparatus, means responsive to said control signal for activating said second modem means to operate at said detected data transmission speed.

3. The apparatus of claim 1 wherein said terminating means includes:

telephone answering machine means for providing a prerecorded message on said one line in response to said incoming call signals.

4. The apparatus of claim 3 wherein said terminating means further includes:

means for indicating the presence of an incoming ringing signal on said one line;

wherein said control means is responsive to said indicating means for activating said switching means to interconnect said telephone answering machine means and said one line.

5. The apparatus of claim 1 further including:

call screening means responsive to said detected control signals for forwarding said incoming call to one of one or more predetermined destinations.

6. The apparatus of claim 5 wherein said detecting means further includes:

means for detecting calling number identification data applied to said one line by said switching system.

7. The apparatus of claim 6 wherein said switching system provides three way calling service to said plurality of lines, said call screening means includes:
 means for storing data, input by the user of said apparatus, indicative of at least one telephone number for call forwarding purposes;
 means responsive to predetermined detected control signals for activating said three way calling service to add one of said lines associated with said stored telephone numbers to the existing call connection.

8. The apparatus of claim 7 wherein said activating means includes:
 means responsive to calling number identification information transmitted to said apparatus via said one line for selecting one of said stored telephone numbers or devices as a function of said calling number identification information.

9. The apparatus of claim 1 wherein said switching system provides three way calling service to said plurality of lines, said decoding means includes:
 means for storing data, input by the user of said apparatus, indicative of a telephone number for call forwarding purposes;
 means responsive to predetermined call control signals received on said one line for activating said three way calling service to add the line associated with said stored telephone number to the existing call connection.

10. In a telephone system that includes a switching system that serves a plurality of lines, apparatus connected to and interconnecting one of said lines and a plurality of communication devices, said apparatus comprising:
 means connected to said one line and responsive to incoming call signals applied to said one line for terminating said one line to establish a call connection, including:
  means for indicating the presence of an incoming ringing signal on said one line;
 telephone answering machine means for providing a prerecorded message on said one line in response to said incoming ringing signal;
 means connected to said one line for detecting signals generated external to said apparatus and applied to said one line, including:
 call screening means responsive to said control signals for forwarding said incoming call to one of one or more predetermined destinations;
 switching means for selectively interconnecting said one line and one of said plurality of communication devices in response to said detected externally generated signals;
 control means responsive to said one communication device disconnecting from said communication connection and said detecting means detecting the presence of externally generated control signals applied to said one line subsequent to said incoming call signals for activating said switching means to interconnect said one line with the one of said plurality of communication devices indicated by said control signals.

11. In a telephone system that includes a switching system that serves a plurality of lines and wherein said switching system provides three way calling service to said plurality of lines, apparatus connected to and interconnecting one of said lines and a plurality of communication devices, a method of interconnecting said plurality of communication devices and said one line comprising the steps of:
 terminating said one line in response to incoming call signals applied to said one line to establish a call connection, including:
 providing a prerecorded message on said one line in response to said incoming call signals;
 connecting said one line with a selected one of said communication devices;
 detecting control signals generated external to said apparatus and applied to said one line during said call connection subsequent to said incoming call signals and concurrent with said selected communication device disconnecting from said call connection; and
 selectively interconnecting said one line to the one of said plurality of communication devices identified by each of said externally generated control signals sequentially applied to said one line during said call connection subsequent to said incoming call signals and concurrent with said selected communication device disconnecting from said call connection;
 forwarding said incoming call to one of one or more predetermined destinations in response to said detected control signals, including:
 storing data, input by the user of said apparatus, indicative of at least one telephone number for call forwarding purposes;
 activating said three way calling service to add one of said lines associated with said stored telephone numbers to the existing call connection in response to predetermined detected control signals, including:
 selected one of said stored telephone numbers as a function of said calling number identification information in response to calling number identification information transmitted to said apparatus via said one line.

12. The method of claim 11 wherein said switching system provides three way calling service to said plurality of lines, said step of forwarding includes the steps of:
 storing data, input by the user of said apparatus, indicative of a telephone number for call forwarding purposes;
 activating said three way calling service to forward the existing call connection to the line associated with said stored telephone number in response to predetermined detected control signals.

* * * * *